United States Patent
Zhao et al.

(10) Patent No.: US 12,314,058 B2
(45) Date of Patent: May 27, 2025

(54) TARGETED DRIVING FOR AUTONOMOUS VEHICLES

(71) Applicant: Waymo LLC, Mountain View, CA (US)

(72) Inventors: Xiaoyue Zhao, Saratoga, CA (US); Henning Hohnhold, San Francisco, CA (US); Xiang Gao, Mountain View, CA (US); Ajay Joshi, Mountain View, CA (US); Vishay Nihalani, San Francisco, CA (US); Katharine Patterson, San Francisco, CA (US); Joseph Lee, Menlo Park, CA (US)

(73) Assignee: WAYMO LLC, Mountain View, CA (US)

( * ) Notice: Subject to any disclaimer, the term of this patent is extended or adjusted under 35 U.S.C. 154(b) by 230 days.

(21) Appl. No.: 17/357,018

(22) Filed: Jun. 24, 2021

(65) Prior Publication Data

US 2022/0413510 A1 Dec. 29, 2022

(51) Int. Cl.
*G05D 1/00* (2024.01)

(52) U.S. Cl.
CPC ......... *G05D 1/0272* (2013.01); *G05D 1/0088* (2013.01); *G05D 1/0221* (2013.01); *G05D 1/0274* (2013.01)

(58) Field of Classification Search
CPC .. G05D 1/0272; G05D 1/0088; G05D 1/0221; G05D 1/0274; G05D 2201/0213; G01C 21/3461; G01C 21/3811; G01C 21/3815; G01C 21/3841; G06Q 10/047; G06Q 50/30; G08G 1/096827; G08G 1/202
See application file for complete search history.

(56) References Cited

U.S. PATENT DOCUMENTS

| | | | |
|---|---|---|---|
| 9,810,545 B2 * | 11/2017 | Golding | G01C 21/3492 |
| 10,379,533 B2 | 8/2019 | Bier et al. | |
| 10,970,746 B2 | 4/2021 | Singhal et al. | |

(Continued)

FOREIGN PATENT DOCUMENTS

| | | | | |
|---|---|---|---|---|
| KR | 2016111645 A | * | 9/2016 | G01C 21/3608 |

OTHER PUBLICATIONS

English translation of KR-2016111645-A (Year: 2023).*

*Primary Examiner* — Scott A Browne
*Assistant Examiner* — Shahira Baajour
(74) *Attorney, Agent, or Firm* — Botos Churchill IP Law LLP

(57) ABSTRACT

Aspects of the disclosure provide a method of providing a destination to an autonomous vehicle in order to enable the autonomous vehicle to collect data according to a targeted driving goal. For instance, a current location of an autonomous vehicle may be received. A set of destinations may be selected from a plurality of predetermined destinations. A route may be determined for each destination. A relevance score may be determined for each destination based on the determined routes and the targeted driving goal. Each destination may be assigned to one of a set of two or more buckets based on the relevance scores. A destination of the set may be selected based on a predetermined sampling probability. The selected destination is sent to the autonomous vehicle in order to cause the autonomous vehicle to travel to the selected destination in an autonomous driving mode.

20 Claims, 15 Drawing Sheets

(56) References Cited

U.S. PATENT DOCUMENTS

| | | | |
|---|---|---|---|
| 2003/0093182 A1* | 5/2003 | Yokoyama | G06N 3/126 700/248 |
| 2011/0316700 A1* | 12/2011 | Kasahara | G06T 7/70 340/541 |
| 2013/0054369 A1* | 2/2013 | Grigg | G06Q 30/02 705/14.58 |
| 2015/0134675 A1* | 5/2015 | Ellis | G06F 16/335 707/754 |
| 2015/0330800 A1* | 11/2015 | Huyi | G06Q 10/047 701/425 |
| 2015/0354978 A1* | 12/2015 | Gerlach | G08G 1/096838 701/424 |
| 2017/0262790 A1* | 9/2017 | Khasis | G01C 21/3415 |
| 2018/0017398 A1* | 1/2018 | McNew | G01C 21/3453 |
| 2019/0234745 A1* | 8/2019 | Lee | B60W 60/001 |
| 2019/0339709 A1 | 11/2019 | Tay et al. | |
| 2020/0209002 A1 | 7/2020 | Hou et al. | |
| 2020/0284597 A1* | 9/2020 | Chellapilla | G06Q 10/02 |
| 2020/0377085 A1* | 12/2020 | Floyd-Jones | B60W 60/0011 |

\* cited by examiner

| Vehicle ID | Status | Location | Last Objective Completed | Software Version(s) | Hardware Version(s) |
|---|---|---|---|---|---|
| 100 | Starting Trip | X,Y,Z | 0001 | R | D |
| 100A | On trip | X1,Y1,Z1 | N/A | S | E |
| 100B | Availible | X2,Y2,Z2 | 0002 | T | F |

TARGETED DRIVING FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services. Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

In addition, humans have historically "scouted" out areas by walking or driving them in order to capture images or make drawings. These have been used to create maps and other types of information. Typically, such scouting is performed by assigning persons to complete certain tasks or by having the vehicles drive around a service area randomly or in specific patterns when not otherwise required to be used for transportation services.

BRIEF SUMMARY

Aspects of the disclosure provide a method of providing a destination to an autonomous vehicle in order to enable the autonomous vehicle to collect data according to a targeted driving goal. The method includes receiving, by one or more processors, a current location of an autonomous vehicle; selecting, by the one or more processors, a set of destinations from a plurality of predetermined destinations; determining, by the one or more processors, a route for each destination of the set of destinations; determining, by the one or more processors, a relevance score for each destination of the set of destinations based on the determined routes and the targeted driving goal; assigning, by the one or more processors, each destination of the set of destinations to one of a set of two or more buckets based on the relevance scores; selecting, by the one or more processors, a destination of the set of destinations based on a predetermined sampling probability assigned to each of the set of two or more buckets; and sending, by the one or more processors, the selected destination to the autonomous vehicle in order to cause the autonomous vehicle to travel to the selected destination in an autonomous driving mode.

In one example, selecting the set of destinations is based on a predetermined number of destinations. In another example, selecting the set of destinations includes selecting destinations within a service area for the autonomous vehicle. In another example, the targeted driving goal includes increasing a number of driving miles with a higher expected disengage rate. In another example, the targeted driving goal includes increasing a number of driving miles with a higher number of lane changes. In another example, the targeted driving goal includes increasing a number of driving miles with narrow lanes. In another example, the targeted driving goal includes increasing a number of driving miles with unprotected turns. In another example, the targeted driving goal includes increasing a number of driving miles with higher expected collision rates. In another example, the targeted driving goal includes increasing a number of driving miles with higher traffic volume. In another example, the method also includes identifying a number of buckets for the set of two or more buckets based on the targeted driving goal. In another example, the method also includes identifying predetermined value ranges for each bucket of the set of two or more buckets before assigning each destination of the set of destinations to the one of the set of two or more buckets.

Another aspect of the disclosure provides a system for providing a destination to an autonomous vehicle in order to enable the autonomous vehicle to collect data according to a targeted driving goal. The system includes one or more processors configured to receive a current location of an autonomous vehicle; select a set of destinations from a plurality of predetermined destinations; determine a route for each destination of the set of destinations; determine a relevance score for each destination of the set of destinations based on the determined routes and the targeted driving goal; assign each destination of the set of destinations to one of a set of two or more buckets based on the relevance scores; select a destination of the set of destinations based on a predetermined sampling probability assigned to each of the set of two or more buckets; and send the selected destination to the autonomous vehicle in order to cause the autonomous vehicle to travel to the selected destination in an autonomous driving mode.

In this example, the targeted driving goal includes increasing a number of driving miles with a higher expected disengage rate. In another example, the targeted driving goal includes increasing a number of driving miles with a higher number of lane changes. In another example, the targeted driving goal includes increasing a number of driving miles with narrow lanes. In another example, the targeted driving goal includes increasing a number of driving miles with unprotected turns. In another example, the targeted driving goal includes increasing a number of driving miles with higher expected collision rates. In another example, the targeted driving goal includes increasing a number of driving miles with higher traffic volume. In another example, the one or more processors are further configured to identify a number of buckets for the set of two or more buckets based on the targeted driving goal. In another example, the one or more processors are further configured to identify predetermined value ranges for each bucket of the set of two or more buckets before assigning each destination of the set of destinations to the one of the set of two or more buckets.

BRIEF DESCRIPTION OF THE DRAWINGS

FIGS. 9A-9B are example tables in accordance with aspects of the disclosure.

DETAILED DESCRIPTION

Overview

Figure 1:
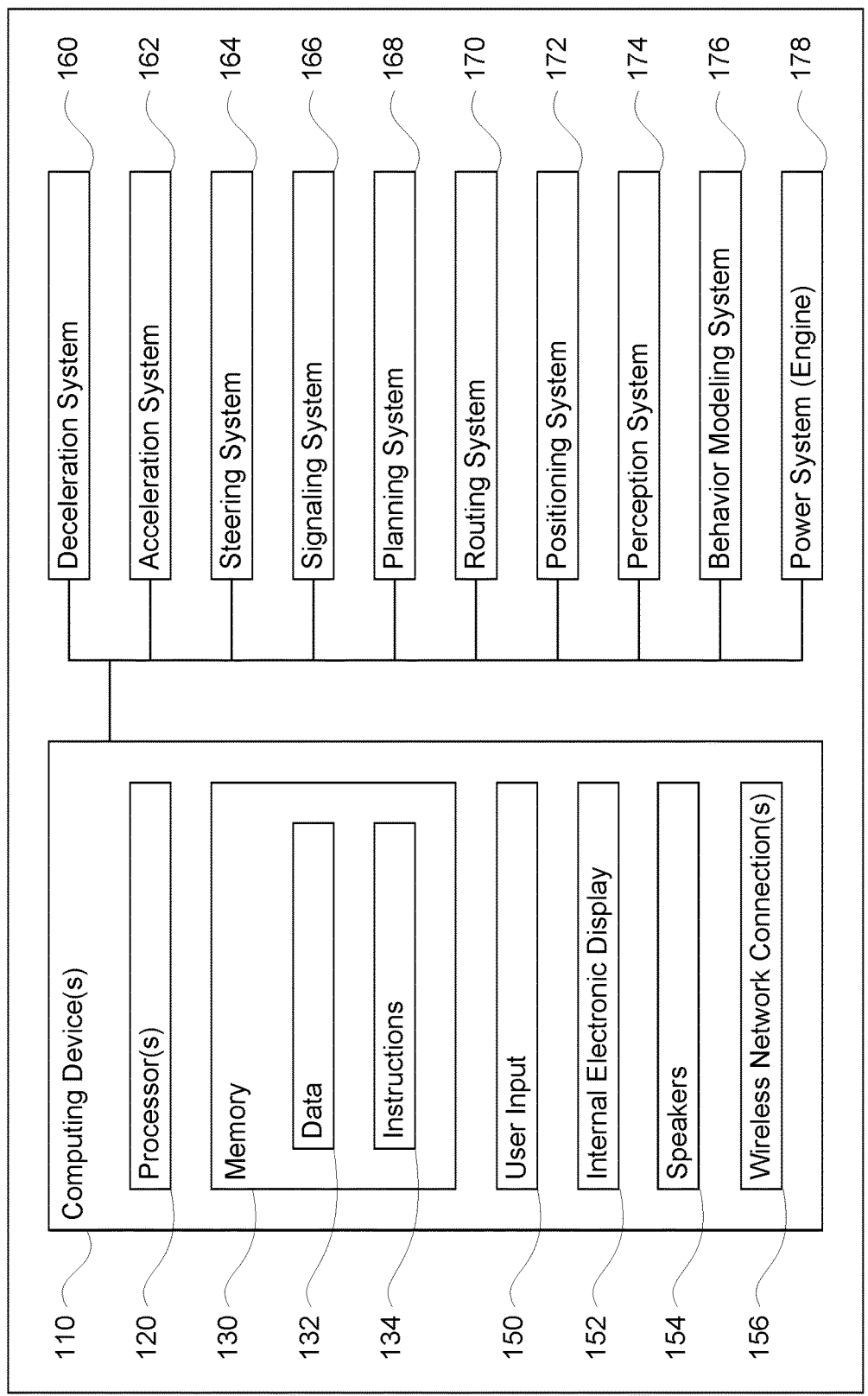
FIG. 1 is a functional diagram of an example vehicle in accordance with an exemplary embodiment.

The technology relates to using a fleet of autonomous vehicles to perform data collection in order to ensure accuracy and freshness of map information as well as to gather targeted data for training models and testing code used on the autonomous vehicles. Typically, this involves an autonomous vehicle driving around a service area randomly (e.g. by randomly selecting a destination from a list of preselected locations) or in specific patterns when not otherwise required to be used for transportation services. However a large portion of this driving is uneventful and thus may not be the best use of such collection efforts. In this regard, in order to improve the results of such collection efforts, a targeted driving system that selects destinations probabilistically may be used which may provide a higher probability of selecting more relevant or useful destinations.

The targeted driving system may be configured to select destinations for autonomous vehicles of a fleet and to track which destinations have been visited. In this regard, the destinations may be pre-defined in map information. At least some of these destinations may correspond to scouting quests and objectives. A scouting quest may include a plurality of scouting objectives to be completed within a given period of time or timeframe. Each scouting objective may generally include a location (e.g. a destination) or area for a vehicle to visit in order to capture sensor data for that area.

The targeted driving system may track the state of the vehicles using information that is periodically broadcast by the vehicles, specifically requested by the targeted driving system (or another system) and provided by the vehicles, or using other methods of tracking the states of a fleet of autonomous vehicles. This periodically broadcast information may include messages providing all state information for a given vehicle including an autonomous vehicle's current location.

Using the current location, the targeted driving system may select a set of the pre-stored destinations for analysis. For instance, the set of destinations may include a predetermined number of destinations selected in order to limit latency in the selection and provision of destinations. These destinations should all be within a service area of the autonomous vehicle, but may be selected using various strategies.

For each destination of the set of destinations, the targeted driving system may determine a relevance score. In order to do so, for each destination, a route may be determined from the current location. The relevance score may then be determined based on one or more factors related to the route. The way in which the relevance score is determined may be based on a goal for the targeted driving. In this regard, depending upon the targeted driving goal, different factors may be used to determine a relevance score for each destination.

Each destination may then be assigned to one of a plurality of buckets. The number of buckets used may depend upon the targeted driving goal. The value ranges for each bucket may be predetermined for instance using simulations to determine which values provide distributions which meet the targeted driving goal using a stratified sampling approach.

A destination may then be selected from the buckets probabilistically. However, in order to increase the likelihood of selecting a destination based on the goal of the targeted driving, the sampling probability may be adjusted. As with the bucket values, the sampling probabilities for the targeted driving may be predetermined based on the targeted driving goal. Again, the sampling probabilities for different targeted driving goals may be determined by using simulations and a stratified sampling approach to determine whether different sampling probability combinations reach the targeted driving goal for the data collection.

The selected destination may then be assigned to the autonomous vehicle. In addition, the selected destination may be sent to the autonomous vehicle in order to cause the autonomous vehicle to travel to the selected destination in an autonomous driving mode. This process may be repeated for each autonomous vehicle of the fleet when that autonomous vehicle completes its current trip.

The features described herein may be used to improve the collection of data by autonomous vehicles. The collected data may be used to compute safety metrics (collision or near collision rate) in order to compare to human benchmarks for performance evaluation and other information. Conceptually, this requires mileage collection to mimic real trips transporting real passengers. With targeted driving, the collected data will be biased towards miles more relevant for data evaluation and testing of autonomous vehicles, while at the same time, an unbiased estimate can also be derived in order to provide a more accurate estimate of metrics of interest.

Example Systems

As shown in FIG. 1, an autonomous vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the autonomous vehicle 100 and may be capable of communicating with various components of the vehicle in order to control the vehicle in an autonomous driving mode. For example, returning to FIG. 1, the computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, the computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, the steering system may include components to control the angle of wheels to turn the vehicle. The computing devices 110 may also use the signaling system 166 in order to signal the vehicle's intent to other drivers or vehicles, for example, by lighting turn signals or brake lights when needed.

Routing system 170 may be used by the computing devices 110 in order to generate a route to a destination using map information. Planning system 168 may be used by computing device 110 in order to generate short-term trajectories that allow the vehicle to follow routes generated by the routing system. In this regard, the planning system 168 and/or routing system 170 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, such as the computing devices 410 discussed below or other computing devices), pullover spots, vegetation, or other such objects and information.

Figure 2:
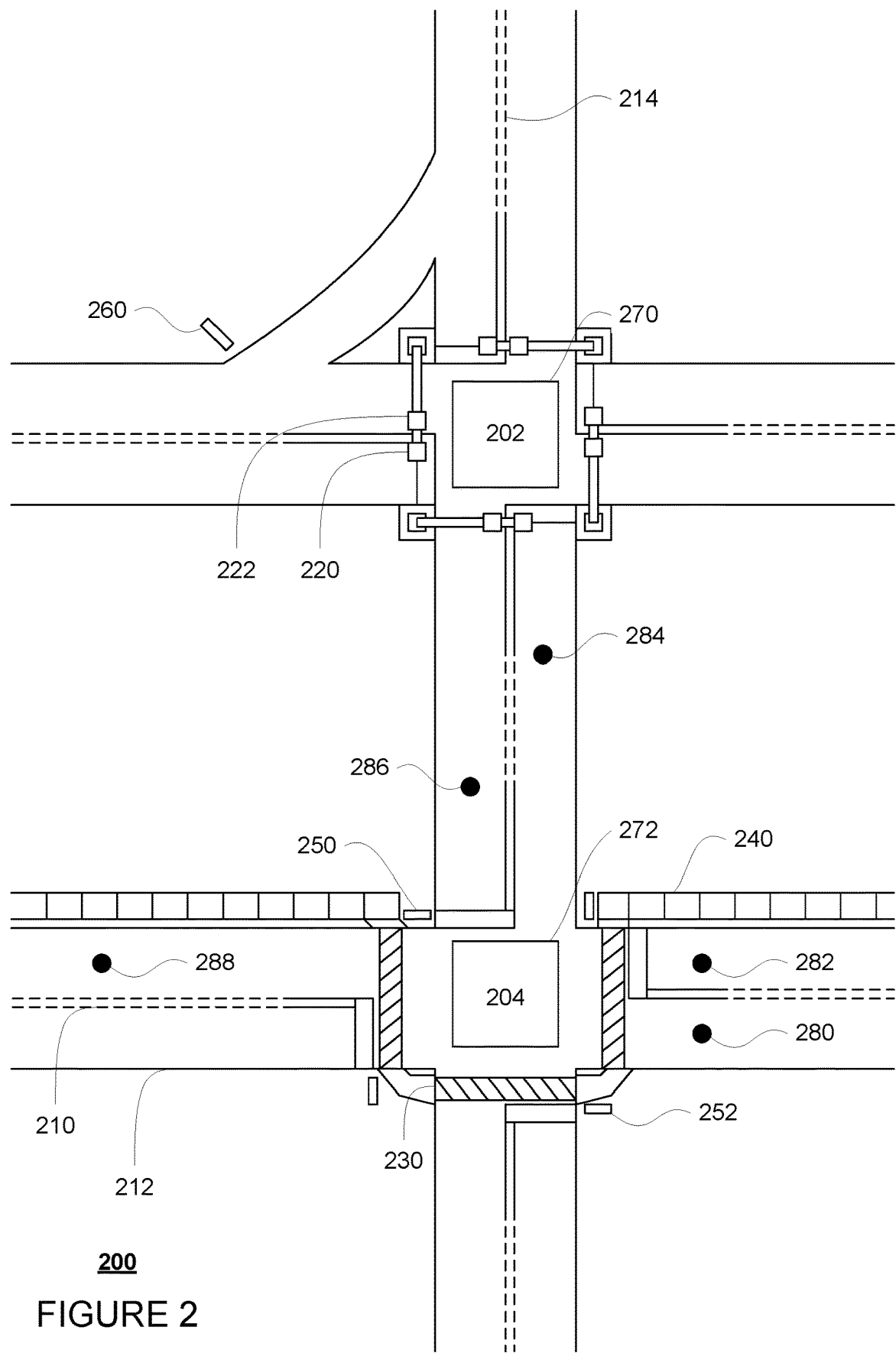
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. The map information may also store a plurality of scouting objectives and scouting quests as discussed in further detail below. In this example, polygon 270 represents a destination for a scouting objective for capturing sensor data for intersection 202, polygon 272 represents a destination for a scouting objective for capturing sensor data for intersection 204, and destinations 280, 288, 284, 288 represent destinations for scouting objectives for capturing sensor data for stop signs 250 and 252, respectively. Although only a few scouting objectives are shown, this is merely for clarity and ease of understanding; the map information may actually include tens, hundreds or thousands of scouting objectives within the area of map information 200.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 170 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 172 may be used by computing devices 110 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location.

Figure 3:
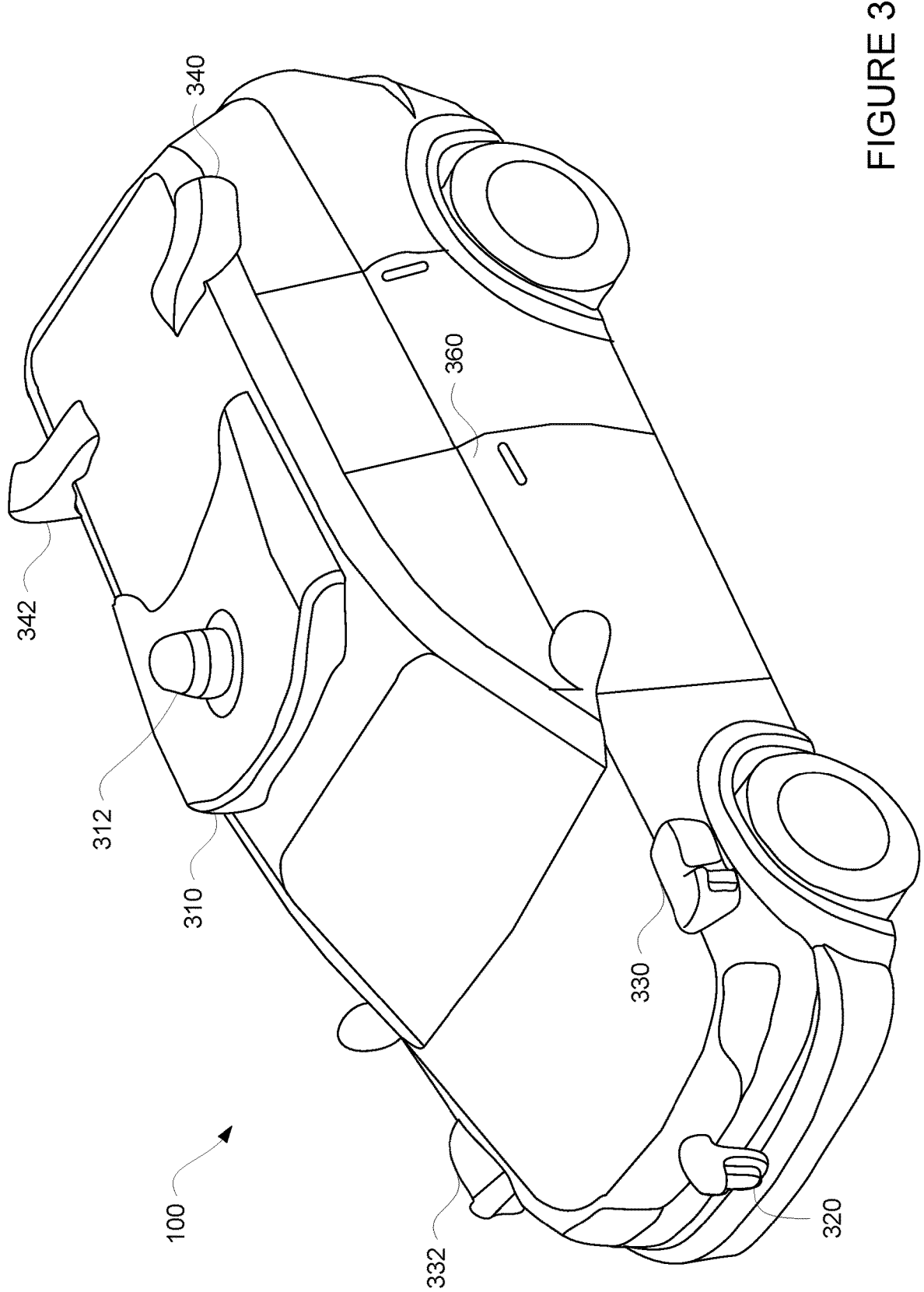
FIG. 3 is an example external view of a vehicle in accordance with aspects of the disclosure.

For instance, FIG. 3 is an example external view of autonomous vehicle 100. In this example, roof-top housing 310 and dome housing 312 may include a LIDAR sensor as well as various cameras and radar units. In addition, housing 320 located at the front end of autonomous vehicle 100 and housings 330, 332 on the driver's and passenger's sides of the vehicle may each store a LIDAR sensor. For example, housing 330 is located in front of driver door 360. Autonomous vehicle 100 also includes housings 340, 342 for radar units and/or cameras also located on the roof of autonomous vehicle 100. Additional radar units and cameras (not shown) may be located at the front and rear ends of autonomous vehicle 100 and/or on other positions along the roof or roof-top housing 310.

The computing devices 110 may be capable of communicating with various components of the vehicle in order to control the movement of autonomous vehicle 100 according to primary vehicle control code of memory of the computing devices 110. For example, returning to FIG. 1, the computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of the behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 172 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
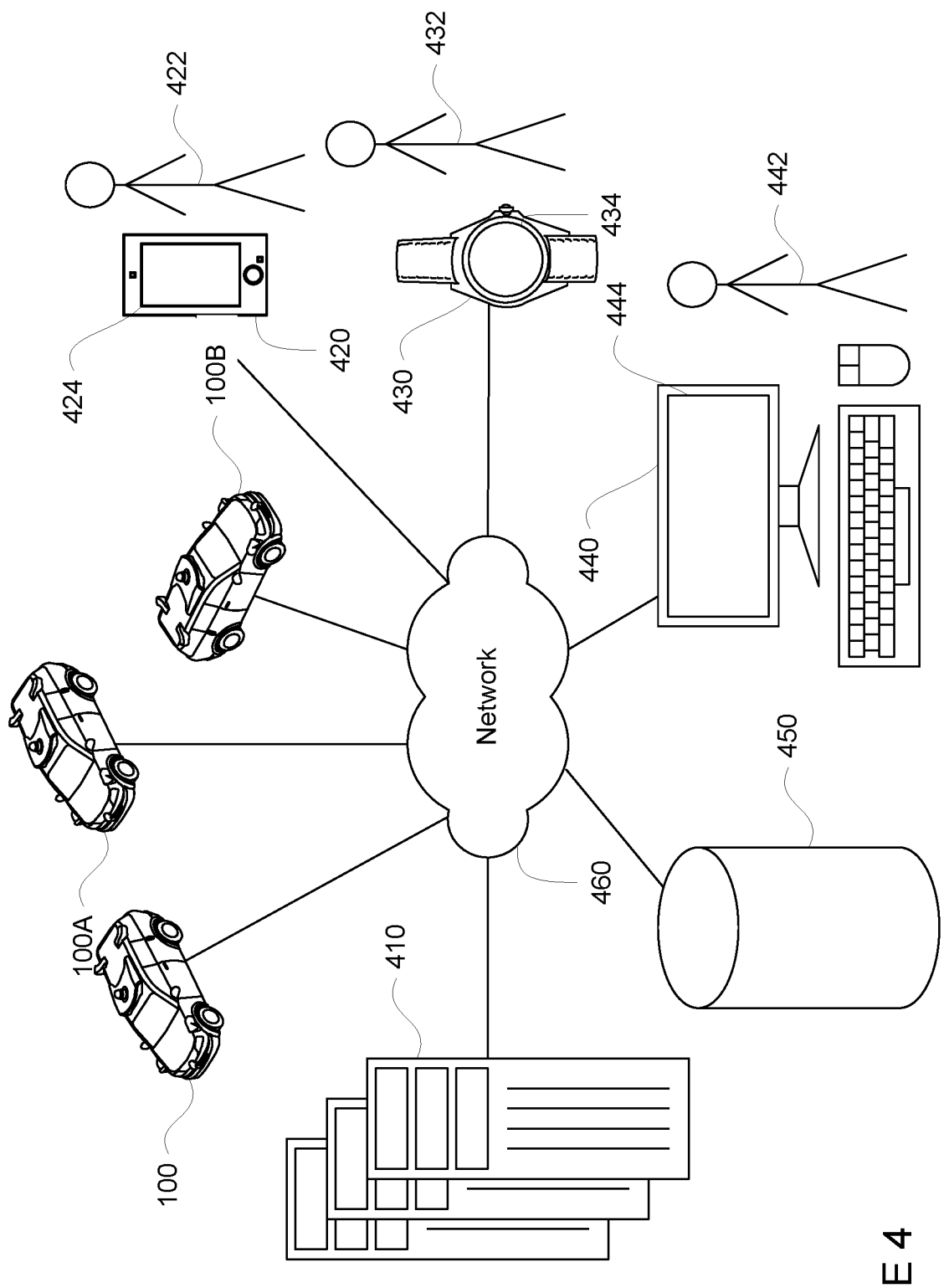
FIG. 4 is a pictorial diagram of an example system in accordance with an exemplary embodiment.
Figure 5:
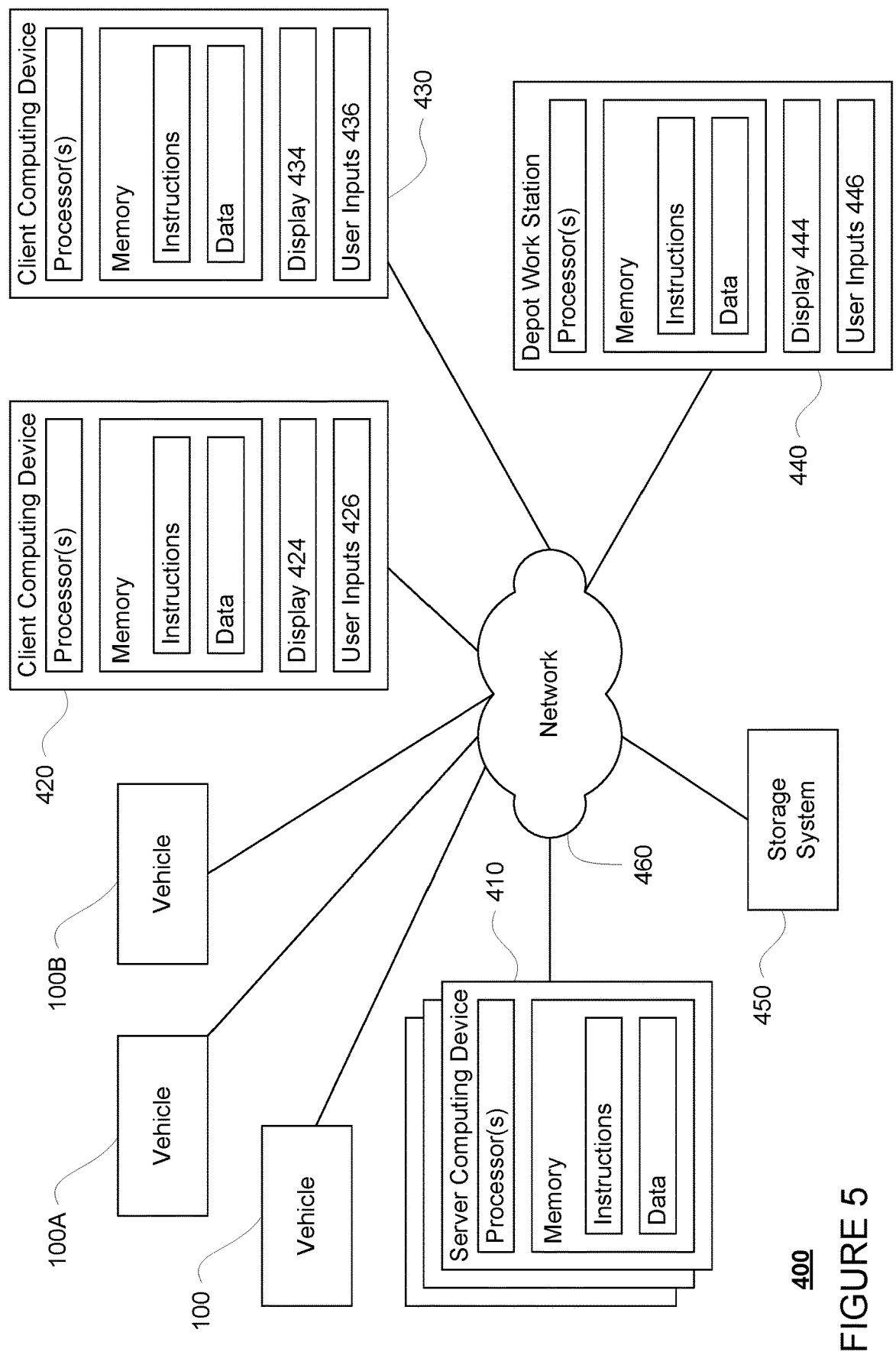
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the fleet management system 410 may function as a fleet management system which can be used to dispatch vehicles such as autonomous vehicles 100, 100A, 100B to different locations in order to pick up and drop off passengers. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 3, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example the user may input information using a small keyboard, a keypad, microphone, using visual signals with a camera, or a touch screen. As yet another example, client computing device 440 may be a desktop computing system including a keyboard, mouse, camera and other input devices.

Each of the client computing devices may be a remote computing device used by a person (e.g. human operators or users 422, 432, 442) to review and analyze sensor data and other information generated by a perception system of a vehicle such as perception system 174 of autonomous vehicle 100. Although only a few remote computing devices are shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices of the fleet management system 410, in order to perform some or all of the features described herein.

Figure 6:
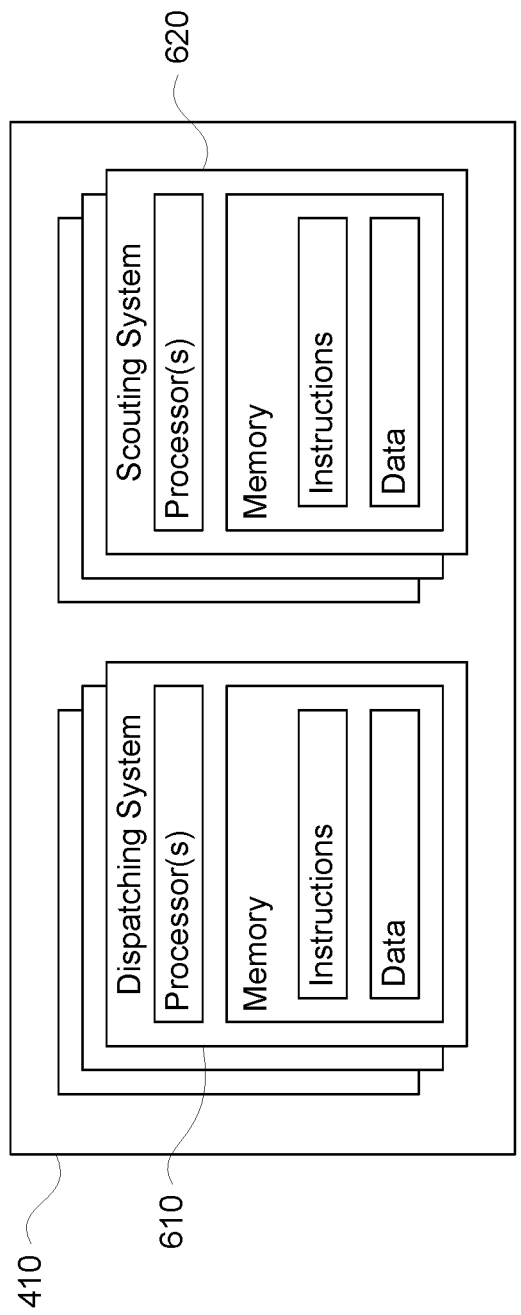
FIG. 6 is an example representation of a fleet management system in accordance with aspects of the disclosure.

FIG. 6 provides additional details of the fleet management system 410. In this example, the server computing devices may include a dispatching system 610 and a targeted driving system 620. Each of the dispatching system 610 and the targeted driving system 620 may include one or more computing devices configured, for instance, as shown with respect to the fleet management system 410. Although the dispatching system and the targeted driving system are depicted as distinct computing devices, these may be actually the same computing devices or the same group of computing devices and may be located proximate to one another or at great distances.

The dispatching system 610 may be configured to select vehicles for ride or transport services depending upon locations of the vehicles, passengers and/or cargo, destinations, etc. This information, including the locations of vehicles, status of passengers and/or cargo, destinations, etc. may be tracked, for instance, in a status table of the storage system 450. In this regard, all or part of the storage system 450 may be remote from or part of dispatching system 610 and/or fleet management system 410. The dispatching system 610 may also track the state of the vehicles using information that is periodically broadcast by the vehicles, specifically requested by the dispatching system and provided by the vehicles, or using other methods of tracking the states of a fleet of autonomous vehicles. This periodically broadcast information may include messages providing all state information for a given vehicle. For instance state messages may be self-consistent and generated based on rules about packaging the messages from various systems of the vehicles. As an example, the messages may include vehicle pose, lane information (i.e., in what lane the vehicle is currently traveling), as well as other information, such as whether the vehicle is currently providing transportation services, experiencing any errors or problems, current destination, etc.

Figure 7:
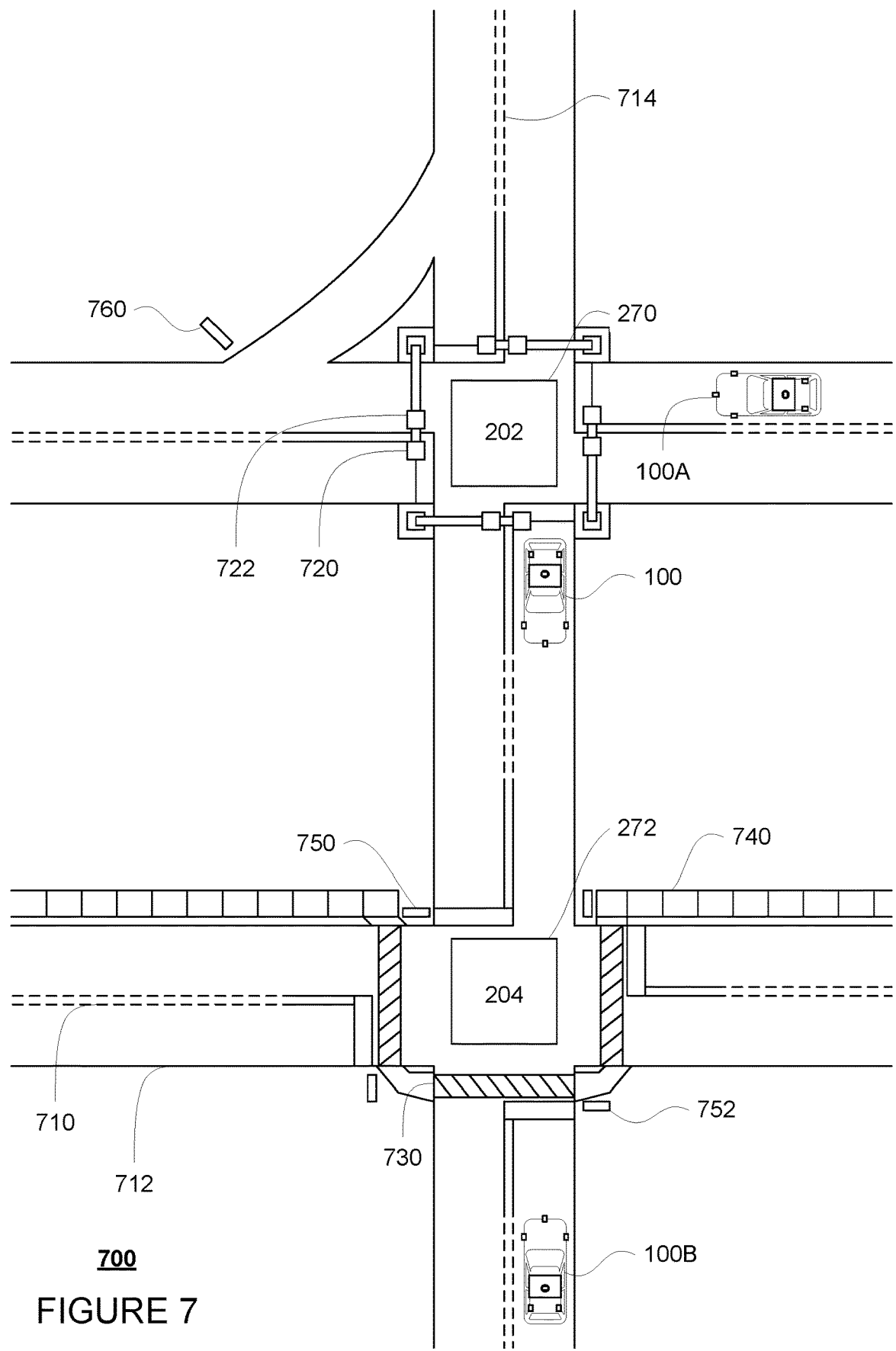
FIG. 7 is an example bird's eye view of a geographic area in accordance with aspects of the disclosure.

As noted above, the vehicles of the fleet drive around, they may report their status to the fleet management system 410, for instance to the dispatching system 610 and/or the targeted driving system 620. Alternatively, one or more of the server computing devices may be dedicated to receiving these reports and updating the information of the storage system 450. For instance, FIG. 7 depicts autonomous vehicles 100, 100A, and 110B being maneuvered on a section of roadway 700 including intersections 702 and 704. In example of FIG. 7, intersections 702 and 704 correspond to intersections 202 and 204 of the map information 200, respectively. In this example, lane lines 710, 712, 714 correspond to the shape, location, and other characteristics of lane lines 210, 212, 214, respectively. Similarly, crosswalk 730 corresponds to the shape, location, and other characteristics of crosswalk 230, respectively; sidewalks 740 correspond to sidewalks 240; traffic signal lights 720, 722 correspond to traffic signal lights 220, 222, respectively; stop signs 750, 752 correspond to stop signs 250, 252, respectively; and yield sign 760 corresponds to yield sign 260.

Each vehicle's positioning system 172 may provide the vehicle's computing device 110 with the vehicle's location and position. The computing devices 110 may then send this information to the fleet management system 410 via update messages. These update messages may be periodically broadcast by each vehicle or specifically requested by the server and provided by the vehicles as discussed above. In addition to the vehicle's location, the different systems of the vehicle may also send information to the computing devices 110 such as whether the vehicle is currently providing transportation services. The dispatching system 610 and/or targeted driving system 620 may use these status reports to update the storage system 450. Thus, these systems may track the status of each vehicle over time.

In order to better assist the targeted driving system 620, the update messages generated by the vehicles may include information about scouting objectives. This may include, for instance, whether the vehicle's pose indicates that the vehicle is inside of a polygon of a scouting objective, whether the vehicle is in a lane belonging to a scouting objective, whether the vehicle has reached a destination of a scouting objective, etc. In addition, because the targeted driving system is constantly tracking the locations of all vehicles, and not simply those that are not currently providing transportation services, the vehicles are able to complete scouting objectives even when they are not necessarily assigned or attempting to do so.

Figure 8:
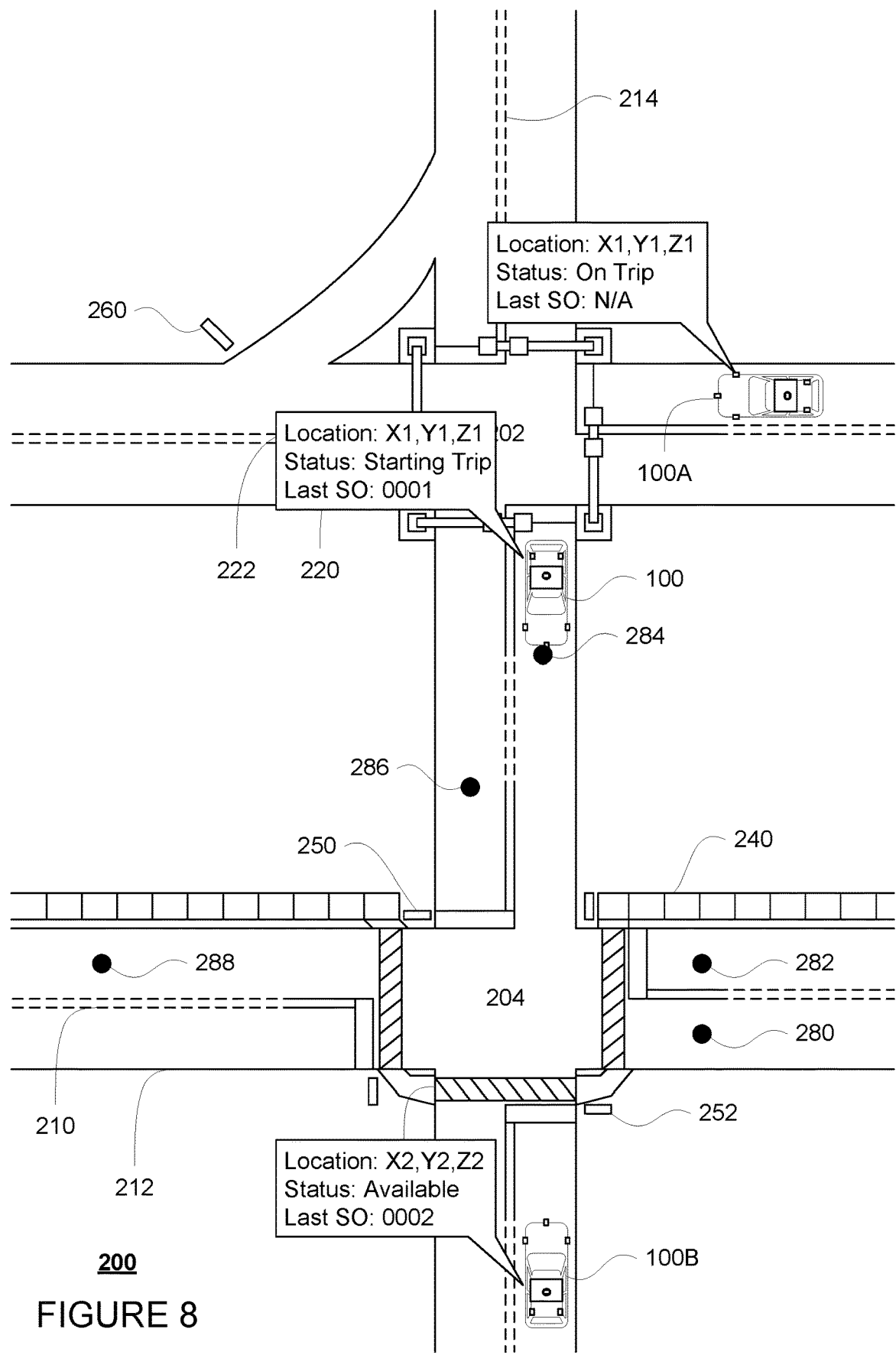
FIG. 8 is an example representation of data in accordance with aspects of the disclosure.

For instance, FIG. 7 depicts autonomous vehicles 100, 100A, and 110B being maneuvered on a section of roadway 700 including intersections 702 and 704. FIG. 8 depicts an example of the information tracked by the dispatching system and/or targeted driving system overlaid on the map information 200. For instance, each of autonomous vehicles 100, 100A, and 100B may report its location as well as other status information. In this example, Autonomous vehicle 100 is reporting that it does not include any passengers or cargo (i.e. is not currently providing transportation services) but is on its way to do so, and that autonomous vehicle 100 has completed the scouting objective 0001 (e.g. for polygon 270). Autonomous vehicle 100A is occupied or providing transportation services to passengers. Autonomous vehicle 100B is available to provide transportation services (i.e. Autonomous vehicle 100B is not on its way to pick up or drop off passengers and/or cargo) and has completed a scouting objective 0002 (e.g. for some scouting objective not depicted). The dispatching system 610 and/or targeted driving system 620 may use these status reports to update the storage system 450. Thus, these systems may track the status of each vehicle over time.

For instance, FIG. 9A is an example of a status table 900 for tracking the location and status of the vehicles of the fleet. As noted above, this status table may be stored in storage system 450 and may be accessible by the various computing devices of the fleet management system. In this example, the status table identifies each vehicle of the fleet as well as its trip status (whether the vehicle is currently providing transportation services), current location, and the last scouting objective visited by the vehicle. In this example, the dispatching system 610 may have updated the status table 900 to indicate the last locations reported by autonomous vehicles 100, 100A, and 100B as shown in FIG. 7. The status table 900 may also track other information useful for providing transportation services, such as the hardware and software versions running on the vehicles. This information in particular can be used to determine whether a vehicle has met or even can meet a constraint for a particular scouting objective, for instance by the vehicle's computing devices 110 and/or the targeted driving system 620.

Figure 9B:
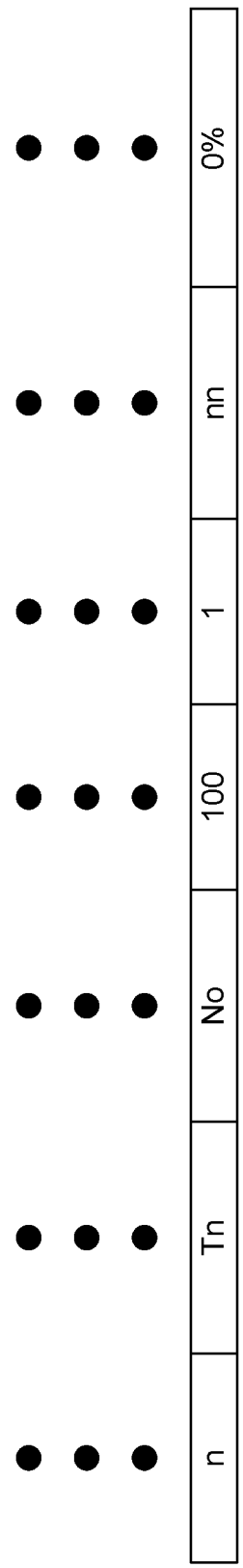

For instance, FIG. 9B is an example of a visit table 950 for tracking the status of scouting objectives and scouting quests. As noted above, this status table may be stored in storage system 450 and may be accessible by the various computing devices of the fleet management system. In this example, the visit table identifies the scouting objective, the last time the scouting objective was completed, the vehicle that completed the scouting objective, whether the scouting objective is currently considered completed (i.e. the last time it was completed is considered recent enough), a priority level for the scouting objective, which scouting quest the scouting objective is included in, percentage of completion of that scouting quest, etc. In this example, the targeted driving system 620 may have updated the visit table 950 to indicate the scouting objective information reported by autonomous vehicles 100, 100A, and 100B as shown in FIG. 7 as well as any other scouting objectives that these vehicles may have completed simply by driving the points and/or areas of the scouting objectives (assuming the vehicles meet any constraints associated with these scouting objectives). The visit table 950 may also track other information useful for managing and tracking scouting requests, such as a vehicle identifier for the last vehicle assigned to complete the scouting objective. Although not shown, the visit table may also include more details about the last vehicle assigned to complete the scouting task and/or a vehicle that has completed the scouting task such as state information about the vehicle, including for instance, whether the vehicle was operating in an autonomous driving mode, what software the vehicle was or is running, what hardware the vehicle was or is using, etc.

The targeted driving system 620 may be configured to identify and assign destinations for autonomous vehicles in order to gather targeted data for training models and testing code used on the autonomous vehicles when such vehicles are not otherwise required to be used for transportation services. The targeted driving system may also track any assigned destinations associated with scouting quests and objectives, as well as to track completion of those quests and objectives, for instance, in the storage system 450. In this regard, all or part of the storage system 450 may be remote from or part of targeted driving system 620 and/or fleet management system 410.

A scouting quest may include a plurality of scouting objectives to be completed within a given period of time or a timeframe. For instance, a scouting quest may include visiting all unprotected left or right turns (e.g. where the autonomous vehicle would not have the right of way over other traffic when making the left or right turn) in a service area of the fleet at least once per week, visiting all intersections in the service area once at least per week, getting images of traffic lights for all intersections at night time at least once per month, passing through every street in the service area at least once per week, checking for wet or snowy areas after precipitation, passing through all construction zone areas at least twice per day, etc.

In this regard, each scouting objective may be defined, in part, by a destination or a location in the map information. The scouting objectives may be inserted into map information used by the vehicles to identify and complete the scouting objectives and quests. Each scouting objective, such as the scouting objectives represented in the map information and described above with regard to FIG. 2, may generally include a destination (e.g. a specific two or three-dimensional location or area) for a vehicle to visit in order to capture sensor data for that area. This destination may be represented by a point, such as for destinations 280, 282, 284, 286, 288, a polygon, such as for polygons 270, 272, circle (for instance represented by a point and a radius), or any other shapes. As an example, each area, point, polygon, circle or other shape, may be specific to a road segment and/or lane of the map information having a particular direction of travel. In this regard, by simply driving or passing through a destination corresponding to a road segment and/or lane, the vehicle is able to complete the scouting objective. The areas of the scouting objectives also may have different geometry and/or metadata depending on what type of scouting is being handled or rather what type of data is to be collected by the scouting objective.

In some instances, the scouting objectives may have certain constraints or vehicle requirements, such as certain software or hardware (e.g. sensor) versions, levels of urgency, or other constraints as discussed further below. This information may be inserted into the map information by periodically broadcasting this information to the vehicles of the fleet, such as autonomous vehicles 100, 100A, and 100B, and/or downloading the data directly to the vehicles' computing devices.

Examples of scouting objectives may include intersection-based objectives, lane-level objectives, traffic light objectives, stop sign objectives, turning objectives (such as unprotected left or right turns, etc.), and so on. As one example, intersection-based objectives may be defined as areas such as polygons or other shapes leading up to an intersection, such as polygon 270 of FIG. 2 for intersection 202. By passing through the polygon 270, a vehicle may be able to capture sufficient sensor data for the intersection 202. As another example, maneuver-type objectives may include curves that map to lanes where precision is required to allow vehicles to complete certain types of maneuvers, such as where information about unprotected left or right turns, U-turns, speed limits, cul-de-sacs, merges, and other free-form navigational paths is required.

At least some of these scouting quests and/or scouting objectives may include constraints. For instance, if a scouting quest is designed to find real world changes, such as new intersections or roads before they are opened up, the scouting quest may include visiting every street within the service area once per week. Of course, the scouting objectives of this scouting quest may be constrained to visiting streets that are typically missed when performing typical transportation services from any direction. As another instance, a scouting objective may require a vehicle to visit a certain location at a certain time of day from a certain direction or perspective and/or during certain weather and/or lighting conditions. For example, if a scouting quest is designed to find new or changed traffic light configurations, the scouting quest may include capturing sensor data (for instance, camera images) of each traffic light in the service area once per day. In addition, the scouting objectives of this scouting quest may be constrained to capturing traffic lights from a certain perspective or direction such that the lights on the traffic lights are visible in a camera image.

As another example, a constraint could include the vehicle "turning-on" a particular functionality, for instance implemented in hardware and/or software, as the vehicle approaches a location. For instance, a vehicle could be required to turn on certain modes of sensing or computing when reaching a location, such as a machine learning model to detect traffic light configuration changes or new stop signs that is too expensive to run all the time, but can be run briefly as the vehicle passes through certain intersections in order to collect information for a scouting objective. Alternatively, rather than including explicit constraints in the scouting objective themselves, the targeted driving system could send commands to the vehicles to turn on the functionality as the vehicle approaches a location of a particular scouting objective.

As noted above, the targeted driving system 620 may also track the completion of scouting objectives and scouting quests. For instance, using the status messages from the vehicles, the targeted driving system may track the movements of the vehicles in the status table 900. From this, the targeted driving system may determine whether a vehicle has passed through a scouting objective and mark that scouting objective as completed in the visit table 950. This may also include confirming whether the vehicle that completed the scouting objective has met any vehicle requirements for that scouting objective.

In addition, certain information in the table may be periodically refreshed. For instance, for a given quest which must be performed within a given period of time such as 7 days, the scouting objectives within the table may be "reset" to not complete or visited after 7 days or after 7 days from the last time the scouting objective was visited. Of course, the table may still store the data for each prior visit for record keeping purposes.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 14:
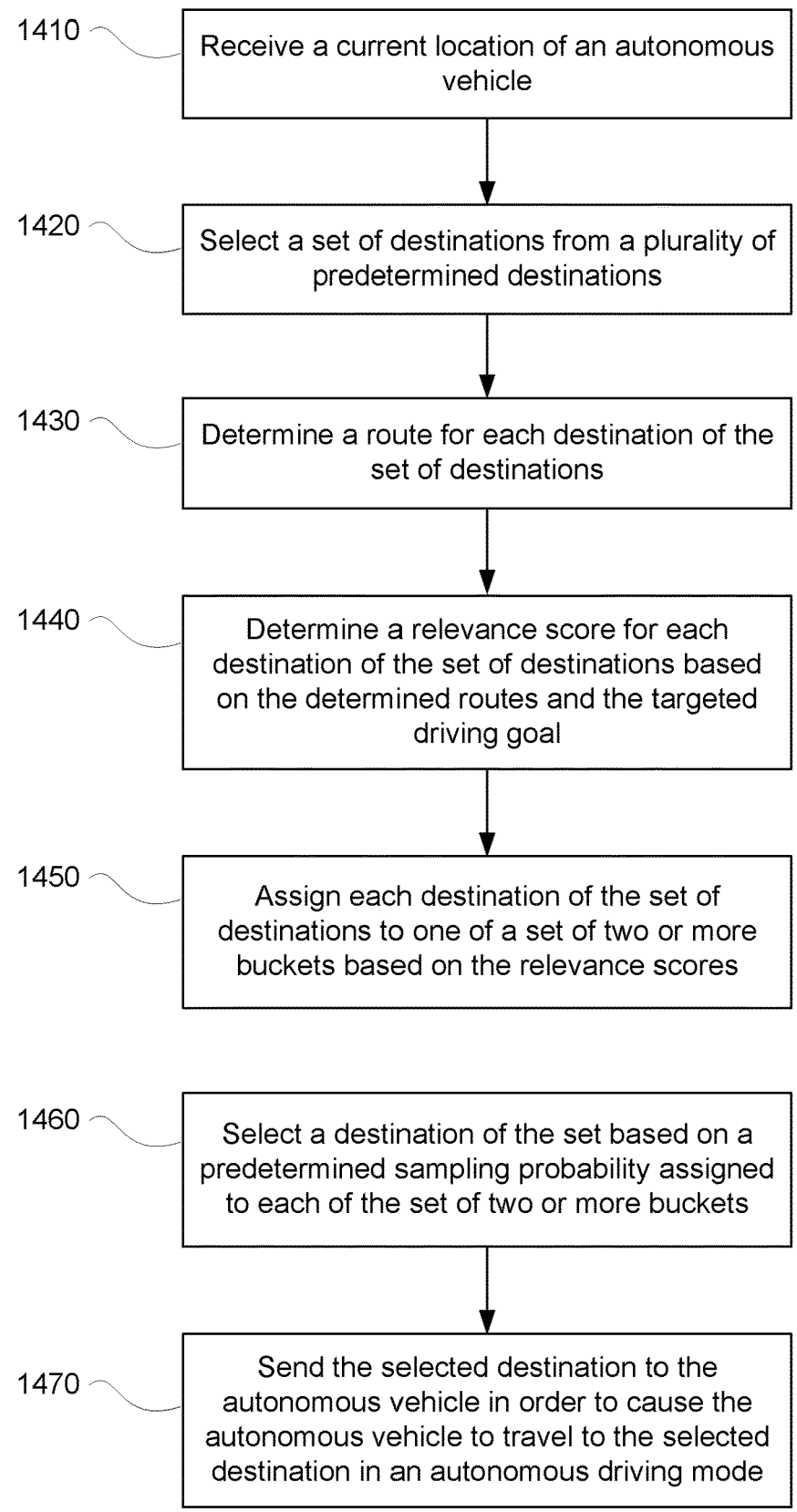
FIG. 14 is an example flow diagram in accordance with aspects of the disclosure.

FIG. 14 is an example flow diagram 1400 for providing a destination to an autonomous vehicle in order to enable the autonomous vehicle to collect data according to a targeted driving goal, which may be performed by one or more processors of one or more computing devices, such as the processors of the targeted driving system 620. At block 1410, a current location of an autonomous vehicle is received. As noted above, the targeted driving system 620 also tracks the state of the vehicles in the status table 900 using information that is periodically broadcast by the vehicles, specifically requested by the targeted driving system 620 (or another system) and provided by the vehicles, or using other methods of tracking the states of a fleet of autonomous vehicles. This periodically broadcast information may include messages providing all state information for a given vehicle including an autonomous vehicle's current location. For instance, returning to FIG. 8, autonomous vehicle 100B has reported its current location and the fact that the autonomous vehicle 100B is available to be assigned a destination. Based on the information that the autonomous vehicle 100B is available, the targeted driving system 620 may attempt to select a destination for a scouting objective and assign that destination to the autonomous vehicle 100B.

In some instances, the scheduling and targeted driving systems may utilize a framework that allows these systems to automatically assign certain numbers of the vehicles of the fleet of autonomous vehicles to different tasks or experiments. In this regard, a certain percentage or number of vehicles of the fleet may be allocated to targeted driving for data collection, while the remaining percentage or number of vehicles may be assigned to other tasks such as providing transportation services, receiving maintenance, etc. At block 1420, a set of destinations is selected from a plurality of predetermined destinations.

Figure 10:
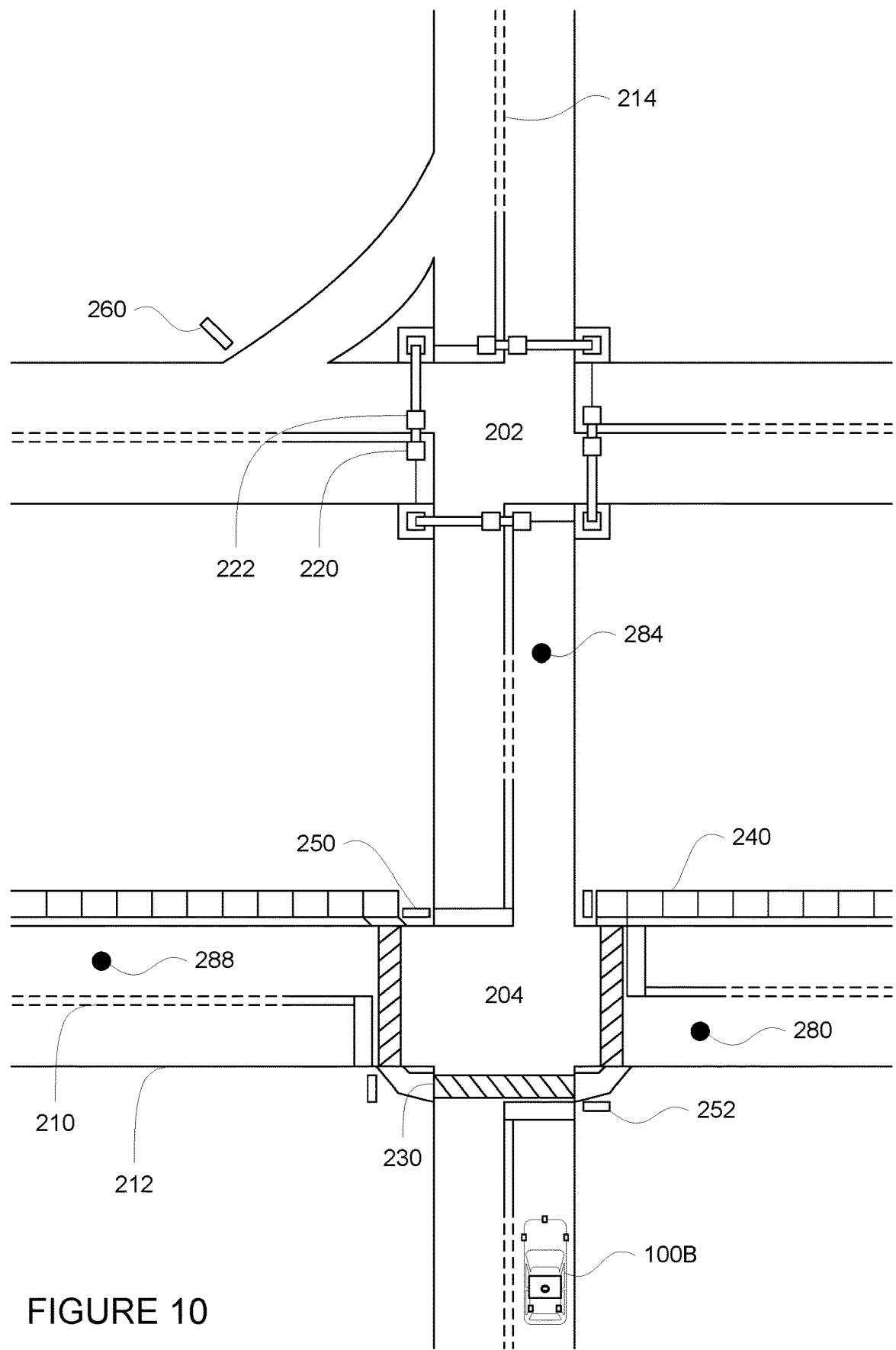
FIG. 10 is an example representation of a set of destinations in accordance with aspects of the disclosure.

Using the current location of the autonomous vehicle 100, the targeted driving system 620 may select a set of the pre-stored destinations for analysis. The pre-stored destinations may be the destinations of various scouting objectives stored in the storage system 450 described above. In this regard, in order to select the set of destinations, the targeted driving system may access the storage system 450. The set of destinations may include a predetermined number of destinations for different scouting objectives selected in order to limit latency in the selection and provision of destinations. As an example, the targeted driving system 620 may select 50 or more or less destinations from the scouting objectives stored in the storage system 450 for analysis. These destinations should all be within a service area of the autonomous vehicle, but may be selected using various strategies. For instance, the destinations may include the closest 50 destinations to the current location, a random selection of 50 destinations within the service area, 50 destinations that were scouted least recently (the longest time ago) or not visited at all, etc. Again these details or rather, the status of each scouting objective and scouting quest, may all be tracked by the targeted driving system 620 as described above. FIG. 10 represents an example representation of the current location of autonomous vehicle 100B and a set of destinations, here destinations 280, 284, 288, selected based on the current location as in the aforementioned examples.

Figure 11:
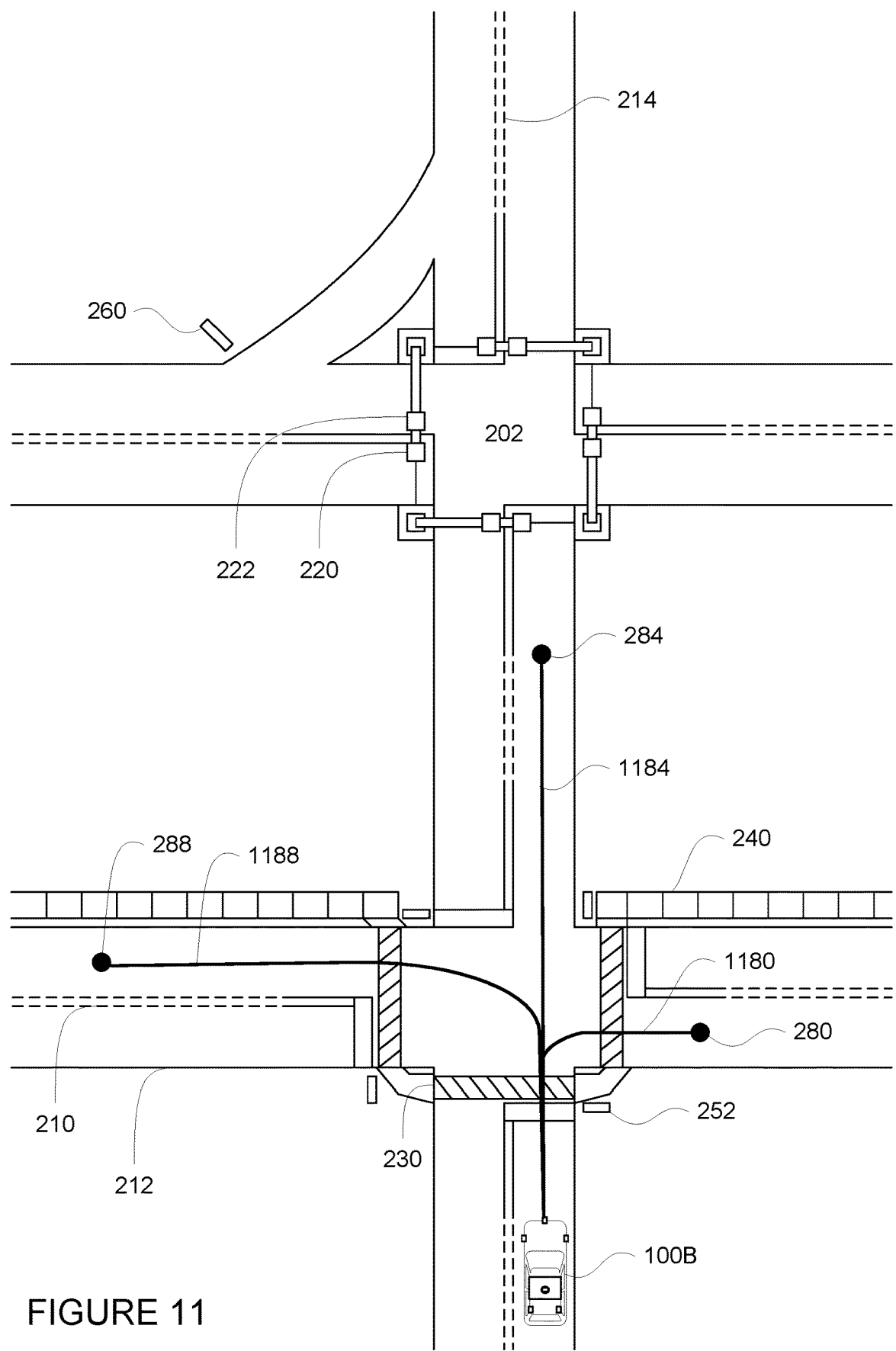
FIG. 11 is an example representation of a plurality of routes in accordance with aspects of the disclosure.
Figure 12:
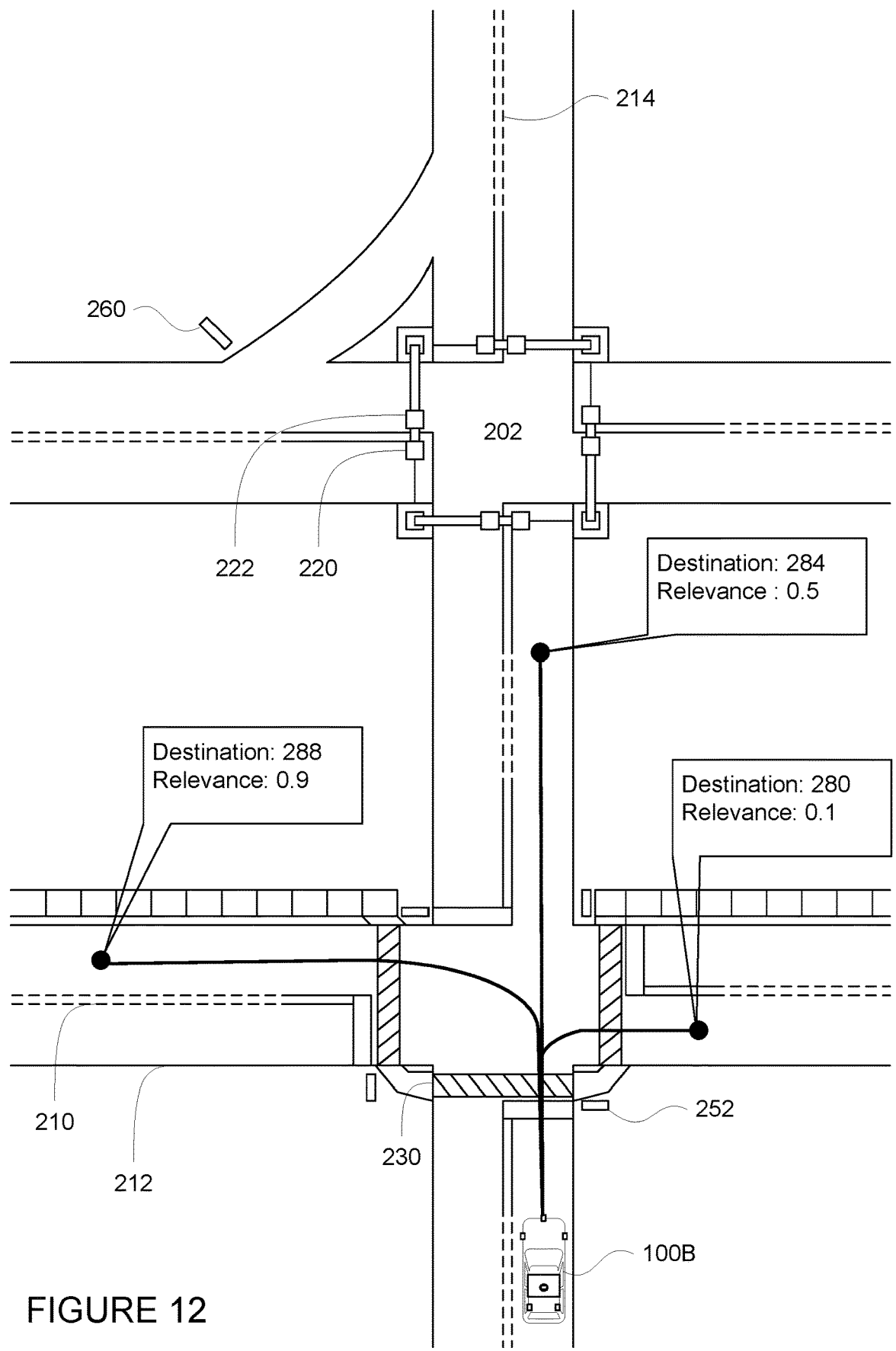
FIG. 12 is an example representation of data in accordance with aspects of the disclosure.

At block 1430, a route is determined for each destination of the set of destinations. The route may be determined by the targeted driving system 620 using a routing system which may be the same or similar to the routing system 170 of autonomous vehicle 100. In this regard, the targeted driving system 620 is more likely to determine routes that the autonomous vehicles 100, 100A, 100B would determine and follow. FIG. 11 represents an example representation of the current location of autonomous vehicle 100B, the set of destinations including destinations 280, 284, 288, as well as a plurality of routes 1180, 1184, 1188 for each of the destinations 280, 284, 288, respectively.

At block 1440, a relevance score is determined for each destination of the set of destinations based on the determined routes and the targeted driving goal. For instance, for each destination of the set of destinations, the targeted driving system 620 may determine a relevance score. The relevance score may be determined based on one or more factors such as a predicted disengage rate per mile (which may be determined by inputting the route into a machine-learned model), the number of lane changes per mile (which may be determined by analyzing the route and map information), fraction of the route in narrow lanes (which may be determined by analyzing the route and map information), unprotected turn rate per mile (which may be determined by analyzing the route and map information), estimated collision rate per mile (which may be determined by inputting the route into a machine-learned model), estimated traffic volume per mile, etc.

The disengage rate may be determined using a machine-learned disengage model. The disengage model may be trained in order to determine a likelihood of a vehicle disengaging from an autonomous driving mode or rather requiring a switch to a manual or semi-autonomous driving mode. For example, training data for this model may include log data that includes messages or annotations identifying actual disengages. This log data may be collected from data generated by a vehicle's various systems. The log data may be a record of all events that occur while a vehicle is driving in an autonomous driving mode. The disengage model may then be trained using time of day information, map information, and the location of the vehicle as training inputs as well as the identified disengages as training outputs. The disengage model may be trained to identify whether a vehicle is likely to disengage at a given location and/or when the vehicle is attempting a particular maneuver. As such, the disengage model can also be used to determine a potential number of disengages for a particular route or portion of a route (e.g. an edge of the roadgraph or another segment of a route). This potential number of disengages may be converted to a disengage rate by dividing the predicted number of disengages by the mileage of the corresponding route to derive the disengage rate (i.e. the number of disengages per mile).

The estimated traffic volume per mile may be determined in various ways. For instance, this value may be a characterization of historical traffic density for that time of day and day of week in a particular area or portion (e.g. series of edges) of the roadgraph. As the vehicles of the fleet drive around, they can collect data (e.g. logs of data generated by the perception and other systems of these vehicles), which can be used to estimate traffic volume at a certain time and location. In addition or alternatively, estimated or live traffic information such as estimated traffic volume per mile or traffic speeds may be retrieved from third party mapping services. Traffic speed can be used to get an approximation of traffic volume since traffic speeds are very dependent on volume of traffic.

The way in which the relevance score is determined may be based on a goal for the targeted driving. In this regard, depending upon the targeted driving goal, different factors may be used to determine a relevance score for each destination. For example, if a targeted driving goal includes increasing a number of driving miles with a greater expected disengage rate (e.g. when an autonomous vehicle needs to transition from autonomous to manual mode for safety or other reasons), destinations for which the determined routes have greater expected disengage rates or numbers of disengagements may have greater relevance scores (e.g. be more relevant) than destinations for which the determined routes have lower expected disengage rates or numbers of disengagements (e.g. be less relevant). As another example, if a targeted driving goal includes increasing a number of driving miles with a greater number of lane changes, destinations for which the determined routes have greater numbers of lane changes may have greater relevance scores (e.g. be more relevant) than destinations for which the determined routes have lower numbers of or no lane changes (e.g. be less relevant). As another example, if a targeted driving goal includes increasing a number of driving miles with narrow lanes, destinations for which the determined routes have greater percentages of narrow lanes may have greater relevance scores (e.g. be more relevant) than destinations for which the determined routes have lower percentages of or no narrow lanes (e.g. be less relevant). As another example, if a targeted driving goal includes increasing a number of driving miles with unprotected turns, destinations for which the determined routes have greater numbers of unprotected turns may have greater relevance scores (e.g. be more relevant) than destinations for which the determined routes have lower numbers of or no unprotected lane changes (e.g. be less relevant). As another example, if a targeted driving goal includes increasing a number of driving miles with greater expected collision rates, destinations for which the determined routes have greater expected collision rates may have greater relevance scores (e.g. be more relevant) than destinations for which the determined routes have lower expected collision rates (e.g. be less relevant). As another example, if a targeted driving goal includes increasing a number of driving miles with greater traffic volume, destinations for which the determined routes have greater estimated or live traffic volume may have greater relevance scores (e.g. be more relevant) than destinations for which the determined routes have lower estimated or live traffic volume (e.g. be less relevant).

These targeted driving goals may also be combined, and the relevance scores determined based on multiple factors. For example, one may want to evaluate software changes impacting an autonomous vehicle's behavior in narrow lanes or during lane changes. As another example, one may also want to collect more training data for scenarios where the data are sparse (e.g. there are too few or no examples). In those cases, it may be more desirable to have more relevant data (e.g., the collection of data is more heavily concentrated toward a particular type of data) to increase the signal to noise ratio.

FIG. 11 represents an example representation of the current location of autonomous vehicle 100B, as well as relevance scores for each of the destinations 280, 284, 288. In this example, the relevance scores for each of the destinations 280, 284, 288 are 0.1, 0.5, and 0.9, respectively. In this example, the relevance scores are represented on a scale from 0 to 1, where 0 is not relevant and 1 is very relevant. As such, destination 288 is more relevant than destination 284 which is more relevant than destination 280.

At block 1450, each destination of the set of destinations is assigned to one of a set of two or more buckets based on the relevance scores. Each destination may then be assigned by the targeted driving system 620 to one of a plurality of buckets. The number of buckets used and the predetermined value ranges for those buckets may depend upon the targeted driving goal. In the example of a targeted driving goal of driving and collecting data in narrow lanes, two buckets (or more) may be used. In the example of a goal of driving and collecting data in situations where the disengage rate is higher, three buckets (or more or less) may be used. The predetermined value ranges for each bucket may be predetermined for instance using simulations to determine which values provide distributions which meet the targeted driving goal (e.g. increasing data collection in narrow lanes by a certain percentage) using a stratified sampling approach. For instance, these simulations may be based on off-board routing systems, similar to routing system 170, in order to provide routes for a list of preselected start and end destinations.

Figure 13:
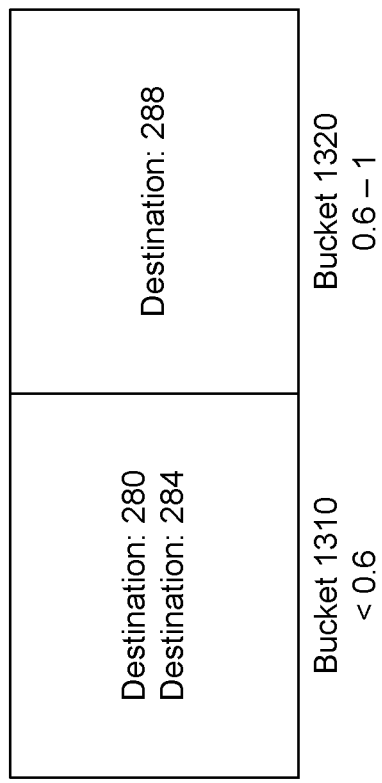
FIG. 13 is an example representation of a plurality of buckets in accordance with aspects of the disclosure.

FIG. 13 represents a plurality of buckets 1310, 1320. Bucket 1310 includes a predetermined value range for relevance values from 0 to less than 0.66, and bucket 1320 includes a predetermined value range for relevance values from 0.6 to 1. In this example, destinations 280, 284 have been assigned to bucket 1310 (based on the 0.1 and 0.5 relevance scores), and destination 288 has been assigned to bucket 1320 (based on the 0.9 relevance score).

At block 1460, a destination of the set of destinations is selected based on a predetermined sampling probability assigned to each of the set of two or more buckets. A destination may then be selected by the targeted driving system 620 from the buckets probabilistically. However, in order to increase the likelihood of selecting a destination based on the targeted driving goal, the "normal" sampling probability may be adjusted. As with the bucket values, the sampling probabilities for the targeted driving may be predetermined based on the targeted driving goal of the targeted driving. Again, the sampling probabilities for different targeted driving goals may be determined by using simulations and a stratified sampling approach to determine whether different sampling probability combinations reach the targeted driving goal of the data collection.

For instance, the sampling probabilities for a targeted driving goal of increasing data collection from narrow lanes may be pre-determined so that the targeted driving system 620 is X times more likely to select destinations with routes having a higher percentage of narrow lanes than destinations with routes with a lower percentage of narrow lanes. The value of "X" may be any value desired by the operators of the transportation service, such as 2, 5, 10, etc. For example, in the two-bucket example, if 20% of the destinations are assigned to a bucket (Bucket A) with a higher fraction of the route in narrow lanes and 80% of the destinations are assigned to a bucket with a lower fraction of the route in narrow lanes (Bucket B), and the predetermined selection probability would have an 80% chance of selecting a random destination from Bucket B and a 20% chance of selecting a random destination from Bucket A. As such, by using different sampling probabilities, e.g. 90% for Bucket A and 10% for Bucket B, the likelihood of a destination that results in an autonomous vehicle collecting more data from narrow lanes is significantly increased as compared to sampling from all of the destinations randomly (e.g. the sampling probability increases from 20% to 90%). Thus, over time, the selected destinations for different autonomous vehicles may be biased more towards the goal of the targeted driving.

Turning to the example of FIG. 13, the probability of randomly selecting a destination from bucket 1310 may be ⅔ and the probability of randomly selecting a destination from bucket 1320 may be ⅓. These sampling probabilities may be adjusted, for instance, in order to decrease the probability of selecting a destination from bucket 1310 and increase the probability of selecting a destination from bucket 1320. As such, the targeted driving system 620 may be more likely to select destination 288 than either of destinations 280, 284. Again, the sampling probabilities used to select a destination for vehicle 100B may be adjusted in order to achieve the goals for the targeted driving as discussed above.

At block 1470, the selected destination is sent to the autonomous vehicle in order to cause the autonomous vehicle to travel to the selected destination in an autonomous driving mode. The selected destination may be assigned to the autonomous vehicle and this assignment may be tracked in the storage system 450 as described above. In addition, the selected destination may be sent to the autonomous vehicle 100B in order to cause the autonomous vehicle to travel to the selected destination in the autonomous driving mode. This process may be repeated for each autonomous vehicle of the fleet when that autonomous vehicle is available (e.g. completes its current trip).

With targeted driving, the collected data will be biased towards more difficult driving. However, in some instances, it may be desirable to remove bias from this collected data. In order to do so, weights for the natural distribution of destinations may be determined and used to determine an unbiased estimate. This information may be derived from "natural driving" or human drivers driving through a service area. The weights may be proportional to miles in actual driving. For instance, using the two-bucket example of Bucket A and Bucket B above, the weights may be determined from the fraction of miles spent by human drivers driving in narrow lanes. The mean output values for each bucket may be computed independently, and the weighted average of those mean output values may be used to determine a value for unbiasing the results.

As an example, the mean of the output values for Bucket A (m_A) may be 1, and the mean of the output values for Bucket B (m_B) may be 5. With random sampling under a natural driving distribution, the expected output value or number of disengages for the Buckets A and B would be 80% of m_A+20% of m_B or (1)*(0.8)+(5)*(0.2)=1.8. If the new biased sampling is adjusted to 10% for Bucket A and 90% for Bucket B. Then the expected average output value or number of disengages for the Buckets A and B would be 1*(0.1)+5*(0.9)=4.6. To compute the overall unbiased values, this weighted average of those two metrics with weights from the natural distribution, i.e. 1.8, may be used. The derived weighted average is an unbiased estimate and may be an efficient estimate with less variance if the sampling probability and buckets are defined strategically based on stratified sampling approach.

The features described herein may be used to improve the collection of data by autonomous vehicles. The collected data may be used to compute safety metrics (collision or near collision rate) in order to compare to human benchmarks for performance evaluation and other information. Conceptually, this requires mileage collection to mimic real trips transporting real passengers. With targeted driving, the collected data will be biased towards miles more relevant for data evaluation and testing of autonomous vehicles, while at the same time, an unbiased estimate can also be derived in order to provide a more accurate estimate of metrics of interest.

Unless otherwise stated, the foregoing alternative examples are not mutually exclusive, but may be implemented in various combinations to achieve unique advantages. As these and other variations and combinations of the features discussed above can be utilized without departing

The invention claimed is:

1. A method comprising:
   determining, by one or more processors, a route an autonomous vehicle based on for each destination of a set of destinations;
   determining, by the one or more processors, a relevance score for each destination of the set of destinations, each relevance score indicating a relevance of each destination to a targeted driving goal, the targeted driving goal defines one or more factors for determining the relevance score for each destination, and the targeted driving goal at least includes a goal of increasing a number of driving miles for collection of data by the autonomous vehicle;
   selecting, by the one or more processors, a destination of the set of destinations based on a corresponding relevance score of the selected destination; and
   sending, by the one or more processors, the selected destination to the autonomous vehicle to cause the autonomous vehicle to travel to the selected destination.

2. The method of claim 1, further comprising:
   selecting the set of destinations based on a predetermined number of destinations.

3. The method of claim 1, further comprising:
   selecting the set of destinations including selecting destinations within a service area for the autonomous vehicle.

4. The method of claim 1, wherein the targeted driving goal further includes driving miles with a higher expected disengage rate.

5. The method of claim 1, wherein the targeted driving goal further includes driving miles with a higher number of lane changes.

6. The method of claim 1, wherein the targeted driving goal further includes driving miles with narrow lanes.

7. The method of claim 1, wherein the targeted driving goal further includes driving miles with unprotected turns.

8. The method of claim 1, wherein the targeted driving goal further includes driving miles with higher expected collision rates.

9. The method of claim 1, wherein the targeted driving goal further includes driving miles with higher traffic volume.

10. The method of claim 1, wherein selecting the destination based on the corresponding relevance score comprises:
    assigning, by the one or more processors, each destination of the set of destinations to one of a set of two or more buckets based on the relevance scores;
    identifying, by the one or more processors, predetermined probabilistic value ranges for each bucket of the set of two or more buckets before assigning each destination of the set of destinations to the one of the set of two or more buckets; and
    selecting the destination of the set of destinations based on a predetermined sampling probability assigned to each bucket of the set of two or more buckets, wherein the predetermined sampling probability assigned to each bucket is based on the identified probabilistic value ranges for each bucket.

11. The method of claim 1, further comprising, receiving, by the one or more processors, data collected by the autonomous vehicle for the selected destination.

12. A method, comprising:
    receiving, by one or more processors, a current location of an autonomous vehicle;
    selecting, by the one or more processors, a set of destinations from a plurality of predetermined destinations;
    determining, by the one or more processors, a route for each destination of the set of destinations;
    determining, by the one or more processors, a relevance score for each destination of the set of destinations, wherein each relevance score indicates a relevance of each destination to a targeted driving goal, and the targeted driving goal defines one or more factors for determining the relevance score for each destination, and the targeted driving goal at least includes a goal of increasing a number of driving miles for collection of data by the autonomous vehicle;
    assigning, by the one or more processors, each destination of the set of destinations to one of a set of two or more buckets based on the relevance scores;
    identifying a number of buckets for the set of two or more buckets based on the targeted driving goal;
    selecting, by the one or more processors, a destination of the set of destinations based on a predetermined sampling probability assigned to each of the set of two or more buckets; and
    sending, by the one or more processors, the selected destination to the autonomous vehicle in order to cause the autonomous vehicle to travel to the selected destination in an autonomous driving mode.

13. A system comprising one or more processors configured to:
    determine a route for an autonomous vehicle based on each destination of a set of destinations;
    determine a relevance score for each destination of the set of destinations, wherein each relevance score indicates a relevance of each destination to a targeted driving goal, the targeted driving goal defines one or more factors for determining the relevance score for each destination, and the targeted driving goal at least includes a goal of increasing a number of driving miles for collection of data by the autonomous vehicle;
    select a destination from among the set of destinations based on a relevance score corresponding to the selected destination; and
    send the selected destination to the autonomous vehicle in order to cause the autonomous vehicle to travel to the selected destination.

14. The system of claim 13, wherein the targeted driving goal further includes driving miles with a higher number of lane changes.

15. The system of claim 13, wherein the targeted driving goal further includes driving miles with narrow lanes.

16. The system of claim 13, wherein the targeted driving goal further includes driving miles with unprotected turns.

17. The system of claim 13, wherein the targeted driving goal further includes higher expected collision rates.

18. The system of claim 13, wherein the targeted driving goal further includes driving miles with higher traffic volume or driving miles with a higher expected disengage rate.

19. The system of claim 13, wherein, to select the destination, the one or more processors are configured to:
- assign each destination of the set of destinations to one of a set of two or more buckets based on the relevance scores; and
- select the destination from among the set of destinations based on a predetermined sampling probability of a bucket of the set of two or more buckets to which the selected destination is assigned.

20. The system of claim 19, wherein the one or more processors are further configured to identify a number of buckets for the set of two or more buckets based on the targeted driving goal.

* * * * *